United States Patent [19]
Bachman

[11] 3,936,804
[45] Feb. 3, 1976

[54] DATA PROCESSING SYSTEM INCORPORATING A LOGICAL MOVE INSTRUCTION

[75] Inventor: Charles W. Bachman, Lexington, Mass.

[73] Assignee: Honeywell Information Systems, Inc., Phoenix, Ariz.

[22] Filed: Dec. 13, 1973

[21] Appl. No.: 424,381

[52] U.S. Cl. ............................................ 340/172.5
[51] Int. Cl.² .......................................... G06F 9/12
[58] Field of Search ...................... 340/172.5; 444/1

[56] References Cited
UNITED STATES PATENTS

| | | |
|---|---|---|
| 3,214,739 | 10/1965 | Gountanis et al. ................ 340/172.5 |
| 3,268,872 | 8/1966 | Kimlinger ......................... 340/172.5 |
| 3,344,403 | 9/1967 | Foulger et al. .................... 340/172.5 |
| 3,579,192 | 5/1971 | Rasche et al. .................... 340/172.5 |
| 3,638,195 | 1/1972 | Brender et al. ................... 340/172.5 |
| 3,675,212 | 7/1972 | Raviv et al. ...................... 340/172.5 |
| 3,699,525 | 10/1972 | Klavins ............................ 340/172.5 |

*Primary Examiner*—Joseph M. Thesz, Jr.
*Attorney, Agent, or Firm*—R. T. Reiling; D. A. Frank

[57] ABSTRACT

Apparatus for utilizing a logical, record oriented move instruction is disclosed. By utilizing separately maintained data field descriptors which define the attributes of the data, the move instruction is able to transfer a multitude of different data types. From a source operand the logical instruction transfers data field by field to the destination. At the time of transfer, the logical move instruction reformats the data to meet the destination's description. The move instruction is applicable both to removing data from a data file and to restoring data into the data file.

6 Claims, 8 Drawing Figures

DATA PROCESSING SYSTEM INCORPORATING A LOGICAL MOVE INSTRUCTION

BACKGROUND OF THE INVENTION

A. Related Applications

1. "Address Development Technique Utilizing a Content Addressable Memory", invented by James L. Brown and Richard P. Wilder, Jr., filed on Aug. 24, 1972, having Ser. No. 283,617 and assigned to the same assignee as the instant invention.

2. "Segmented Address Development", invented by Bienvenu and filed on May 16, 1974, having Ser. No. 470,496 and assigned to the same assignee as the instant invention.

3. "Data Processing System Utilizing Data Field Descriptors for Processing Data Files", invented by Charles W. Bachman, filed on Dec. 13, 1973, having Ser. No. 424,259 and assigned to the same assignee as the instant invention.

4. "Data Processing System Incorporating a Logical Compare Instruction", invented by Charles W. Bachman, filed on Dec. 13, 1973, having Ser. No. 424,406 and assigned to the same assignee as the instant invention.

5. "Data Processing System Utilizing a Hash Instruction for Record Identification", invented by Charles W. Bachman, filed on Dec. 13, 1973, having Ser. No. 424,391 and assigned to the same assignee as the instant invention.

6. "Procedure Calls And Stack Mechanism" invented by Marc Appell et al., filed on Nov. 30, 1973 in France, having French Ser. No. 73 42705, assigned to the same assignee named herein and further filed in the U.S. on a priority convention date of Dec. 2, 1974 and having U.S. Ser. No. 529,019.

B. Field of the Invention

This invention relates generally to data processing systems and more particularly to an apparatus for transferring data from a source field to a receiving field.

C. Description of the Prior Art

Because today's digital processors are capable of operating at rates many times higher than the rates at which individual users are able to supply and accept data, the concept of time sharing a single data processor between a large number of users is finding wider and wider application. A significant problem which has long been encountered by time sharing services arises from the fact that the large number of users of the service write their own data base files and therefore specify the data in their data bases in a variety of ways. As a consequence of having a variety of different data types, data processing manufacturers have had to write complicated programs to convert and handle each of the various data types. This development is expensive since it not only includes a large amount of storage space required for instructions for each data type but also results in an extremely slow performance by the data processor.

For primitive operations such as a move operation, the concept of data independence has become significant. In description controlled files, i.e., files where the description of the contents and structure of the data is carried separately from the program, data independence requires two forms of data field representation, i.e., first the form of data field seen by the program and second the form of the data field on secondary storage. This requirement, however, makes the task of deblocking and enblocking data many times more burdensome. It has been shown that a substantial amount of data processing time is used in first decoding the type of move instruction required to deblock or enblock data and second, in the selection of the specific move instruction based on the characteristics of the sending and receiving operands.

One prior art solution to the problem of providing a move instruction to deblock and enblock different formats of data utilizes an instruction having additional bits. Some of these additional bits would indicate the data type of the source and the remainder of the bits would indicate the data type of the destination. With this knowledge, the proper subroutine to be invoked in order to transfer data from the source to a description consonant with the destination would be possible. While this solution eliminates the subroutine necessary to determine the format of data, this solution suffers from the fact that the data types must be known beforehand. Moreover, when new or different users are added to the data processing system, a regression to the former practice results since a new program and additional memory space is required.

The present invention concerns itself with a move instruction defined for all data types. Thus no matter what format a user defines his data base files, the move instruction is applicable for each situation. Moreover, by providing a move instruction defined for all data types, data independence is achieved.

In the related application to Charles W. Bachman, Ser. No. 424,259, filed on Dec. 13, 1973, incorporated fully herein, the data field descriptors describing the attributes of the various fields of a user are enumerated. By utilizing these data field descriptors, the move instruction becomes a general purpose logical instruction which operates on a plurality of various data types. It accomplishes this feature by transferring and reformatting the data at the time of execution into the format required by the destination. Thus prior to the execution time, a general procedure has been followed which requires no specialized subroutine as required by the prior art. Moreover, the specialized instructions having the additional bits are not required herein since the general purpose instruction itself executes the move operation based on the data field descriptors associated with the data fields.

This solution provides further embellishments in that alteration of the records in a field or restructuring of records in a file is easily accomplished by merely changing the data field descriptor. Since the instruction is not dependent upon the information as defined by the user, any alteration or change is resolved at execution time as was the situation for the unaltered fields. As a result, no additional or new subroutines or other solutions are required.

OBJECTS OF THE INVENTION

It is an object of this invention to provide an improved data processing system which is able to operate with a variety of data types from a plurality of users.

It is another object of this invention to eliminate the requirement of special subroutines to operate on primitive operations such as a move for each variety of data types.

It is a further object of this invention to provide a move instruction in a data processing system which significantly increases the operational performance of the overall system and eliminates the programmed requirements previously necessary.

It is yet another object of this invention to provide a data processing system which can quickly and efficiently execute a logical move instruction for all data types.

SUMMARY OF THE INVENTION

The foregoing objects are achieved according to one embodiment of the invention and according to one mode of operation thereof, by providing in a data processing system a move instruction which locates both the data of the source field and the data attributes of the source and destination operands. The latter attributes are developed by indirection of an address syllable within the move instruction which specifies data field descriptors. After the data and its attributes have been determined, the move instruction under control of a control store unit and a control store interface adapter unit provides for the transfer and reformatting of the data to meet the receiving field description. When all the data of the source field has been transposed to the receiving field, the next instruction is executed.

BRIEF DESCRIPTION OF THE DRAWINGS

The novel features which are characteristic of this invention are set forth with particularity in the appended claims. The invention itself, however, both as to its organization and operation together with further objects and advantages thereof may best be understood by reference to the following description taken in connection with the accompanying drawings in which:

DETAILED DESCRIPTION OF THE PREFERRED EMBODIMENT

Figure 1A:
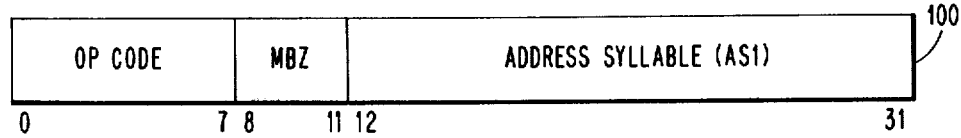
FIG. 1 (which includes FIGS. 1a–1c) is a schematic diagram of various hardware structures utilized in the present invention.

In FIG. 1 the words which provide for the implementation of the move instruction of the present invention are illustrated. More specifically, FIG. 1a shows the first word of move instruction 100 utilized in the present invention. In FIG. 1a, the first eight bits specify and operation code, i.e., OP code that has a particular bit designation which when decoded identifies the move instruction. The next 4 bits, bits 8–11 are shown as MBZ which indicates these bits must be zero. Bits 12–31 identify the first address syllable which is a logical representation of the source field operand in memory.

For the particular type of operation utilized herein the address syllable has its first bit, i.e., bit 12 set to a binary ONE. This bit is utilized to specify the indirect addressing mode which accesses data field descriptors as shown in FIG. 1c via the mechanism cited in co-pending application to Charles W. Bachman for Data Processing System Utilizing Data Field Descriptors for Processing Data Files. The retrieval and development of the data field descriptors will not be explained herein since a comprehensive description has been made in the above application.

For the move instruction, two address syllables are required since the attributes of the source and the destination must be known. Thus the first address syllable, AS1, i.e. bits 12–31, specifies the logical operand of the source as provided by the user and brought into a memory location; and the second address syllable, AS2, i.e. bits 44–63, specifies the logical operand of the destination.

Each address syllable AS1 and AS2 for a move instruction references a data field descriptor, as shown in FIG. 1c as words 102, 104, and 106. Words 102 and 104 will eventually be stored in the general registers designated in FIG. 1b as bits 32–39. In the second word of instruction 100, bits 32–35 designate a first general register corresponding to the first address syllable; bits 36–39 designate a second general register which holds the information developed by the second address syllable. The second address syllable is shown as bits 44–63 which like address syllable AS1 develops by indirection words a data field descriptor in FIG. 1c.

A data field descriptor may include up to three words shown as words 102, 104 and 106. Word 102 is a data descriptor which has a tag field for its first two bit locations. This tag field has a code 01 which indicates that an additional word(s) is part of the descriptor. This additional word(s) is an extended data descriptor 104 which may indicate another word 106 to be subsequently explained. Word 102 also contains a segmented address indicated as STE, STN and displacement. These fields locate the operand, i.e. data field, which the extended data descriptor describes. The segmented address development is fully described in the Segmented Address Development application previously cited. Any of the indirect addressing structures may be used since word 102 is merely illustrative of one indirect addressing mechanism.

Word 104 is an extended data descriptor which contains descriptors particularized to the operand. These descriptors are decoded by the circuitry to be subsequently explained such that high overall performance for the move instruction is realized. More specifically, in word 104, bits 32–34 identify a bit string which offers the user the capability of compacting information on his files in the form of bit strings. Bit 35 must be zero. Bits 36–38 specify an array field which defines array control of the operand. By array control is meant that more than one operand is located in the data field pointed to by the address syllable. If the value of bit 36 is a binary ONE, word 106 having a length and size field is accessed in order to determine the location of the particular operand and its size in the array field.

Bit 39 of the word 104 specifies an alterability indicator. If the alterability indicator is present, i.e., if the bit is a binary ONE, the operand in the source field as described by the data field descriptors may be written into the operand pointed to by the destination.

Bits 40–63 of word 104 specify the data field descriptors identifying characteristics of the data. More specifically, bits 40–47 specify the data type. By data type is meant a description of certain features of the format of information as provided from a user. For example, a binary code of certain value could indicate alphanumeric string; unpacked decimal; packed decimal; and other various formats of information. For purposes of the move instruction, four groups will be distinguished.

The first group is the alphanumeric string format whereby field-to-field transformations occur. The second group includes unpacked and packed decimals which are changed to the receiving field configuration; the third group concerns additional formats which must be translated to the receiving fields description; and the fourth group concerns those formats unavailable for translation purposes and requiring an exception condition to invoke another mechanism. Translation is provided by well known means such as programmable read only chips (PROM). Depending upon the data processor, the following data types may, at least, be classified in group three: character strings, unsigned short binary data, signed short binary data, unsigned long binary data, signed long binary data, short logical binary data, long logical binary data. Obviously, as other data formats are introduced, translation tables may be provided for them.

Bits 48–55 define the key field of the operand. The key field is a description of certain features for a particular data type, i.e., a description of the form of information which the user has provided. As a result, the key field provides a secondary imposition of requirements on the data type. For example, if pounds per square feet were to be moved from a source field to pounds in a destination field, the key would indicate that such an operation was not allowable. Thus, even if data types are compatible, some conversion may be required if unequal key fields are presented.

Bits 56–63 of word 104 are an 8 bit length description of the operand pointed to by the address syllable. The length description indicates the number of bytes in the operand. The operand's length may meet the following condition: first, for a byte string the length must be less than or equal to 256 bytes; second, for a decimal string, the length must be less than 32 digits. If the length exceeds these limits, an illegal data exception results.

FIG. 1c shows word 106 containing bits 64–79 specifying a length indication and bits 80–95 specifying a size indication. Each of these is used when the array bound index of bits 36–39 of word 104 is present. A detailed explanation of these fields is given in the Charles W. Bachman patent application previously cited as related Application No. 3. In order to simplify the description of the invention, the mechanism provided by this word 106 to obtain the data is not explained herein.

Figure 1B:
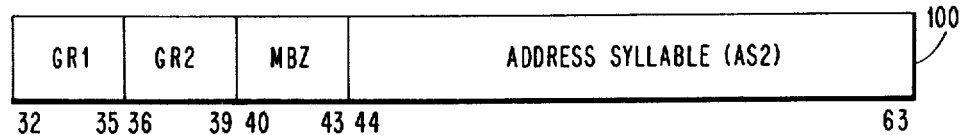
Figure 1C:
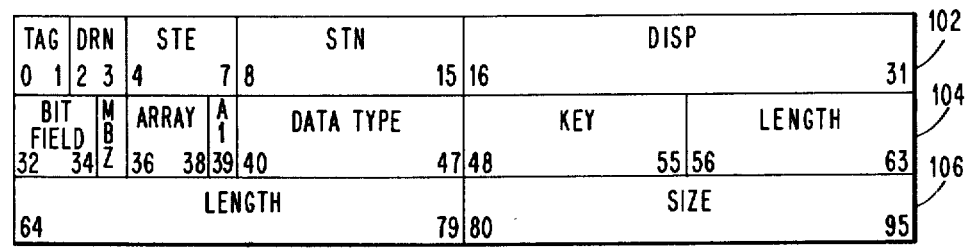
Figure 2:
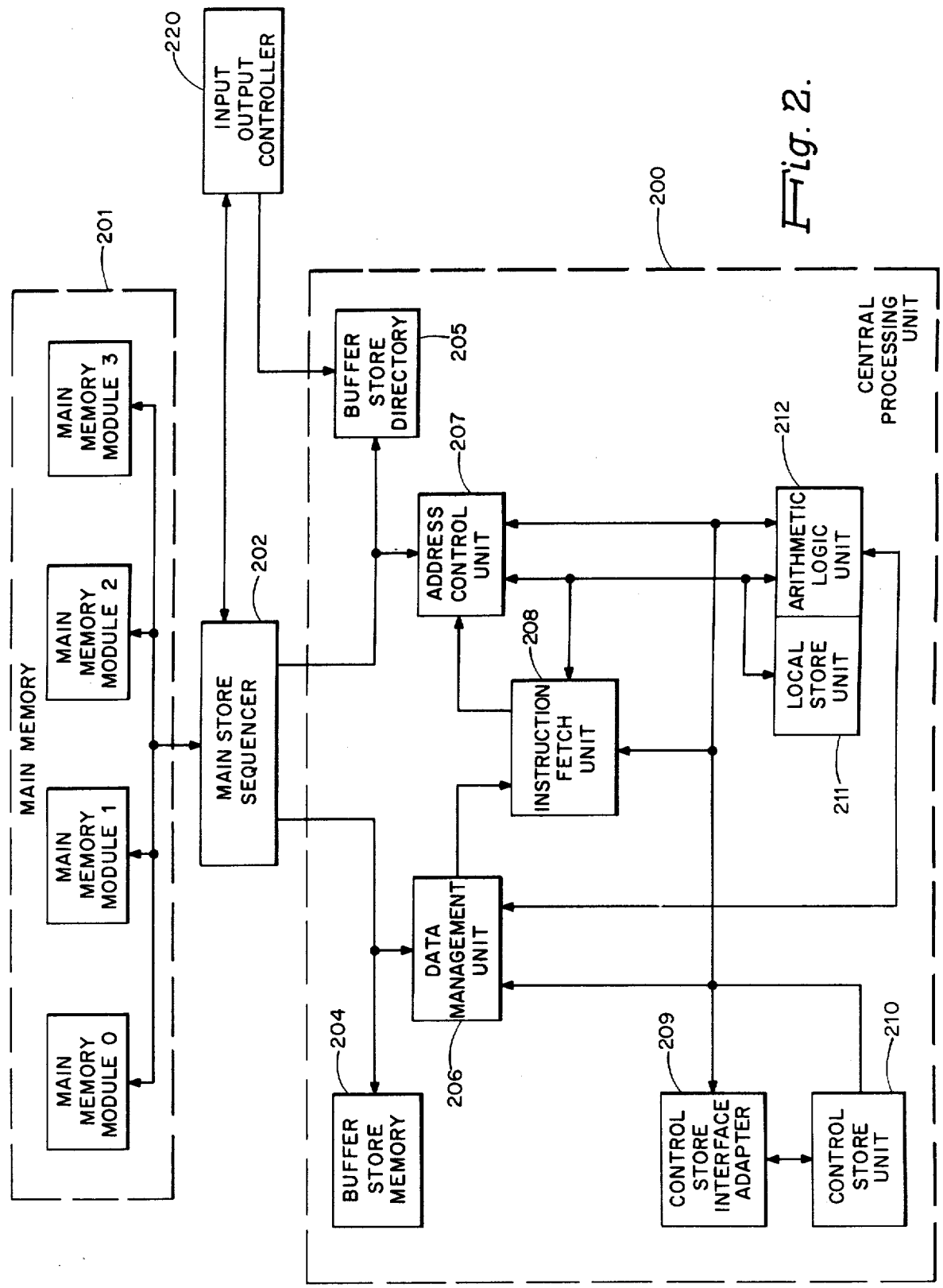
FIG. 2 is a general block diagram of a data processing system embodying the present invention.

The explanation of the operation of the instruction 100 as shown in FIGS. 1a and 1b and the data field descriptors resulting from the address provided by instruction 100 as shown in FIG. 1c will be better understood when viewing the block diagram of FIG. 2 which shows a data processing hardware system which utilizes the invention.

Referring to FIG. 2, a main memory 201, is comprised of four modules of metal-oxide semiconductor (MOS) memory. The four memory modules 0–3 are interfaced to the central processor unit 200 via the main store sequencer 202. The four main memory modules 0–3 are also interfaced to the peripheral subsystem such as magnetic tape units and disk drive units (not shown) via the main store sequencer 202 and the input/output controller, IOC 220. The main store sequencer gives the capability of providing access to and control of all four memory modules. Because the memory store sequencer 202 can overlap memory cycle request, more than one memory module 0–3 may be cycling at any given time. The CPU 200 and the buffer store memory 204 and the IOC 200 can each access a double word (8 bytes) of data in each memory reference. However, in a CPU memory access, either the four high-order bytes or the four low-order bytes are selected and only four bytes of information are received in the CPU 300.

Operations of the CPU are controlled by a read only memory ROM, herein called the control store unit 210. (Control store units for implementing the invention are found in a book entitled Microprogramming: Principles and Practices, by Samir S. Husson and published in 1970 by Prentice-Hall Inc. Other typical control store units are described in U.S. Pat. to Leonard L. Kreidermacher, having U.S. Pat. No. 3,634,883 issued Jan. 11, 1972, and assigned to Honeywell Inc.). Each location in the control store memory 210 can be interpreted as controlling one CPU cycle. As each location of control store is read, its contents are decoded by a micro-op decode function. Each micro-op decode function causes a specific operation within the CPU to take place. For example, control store data bits 1, 2, and 3 (not shown) being decoded as 010 could bring high a micro-op decode function that causes an A register (not shown) to a B register (not shown) transfer. Because each control store memory location may contain 30 to 80 bits, many micro-op decode functions can be brought high for each control store cycle.

By grouping locations, control store sequencers are obtained that can perform a specific CPU operation or instruction. As each instruction is initiated by the CPU 200, certain bits within the op-code are used to determine the control store starting sequence. Testing of certain flops (not shown) which are set or reset by instruction decode function allows the control store memory to branch to a more specific sequence when necessary.

The control store interface adapater 209 communicates with the control store unit 210, the data management unit 206, the address control unit 207 and the arithmetic logic unit 212 for directing the operation of the control store memory. The control store interface adapter 209 includes logic for control store address modification, testing, error checking, and hardware address generation. Hardware address generation is utilized generally for developing the starting address of error sequences or for the initialization sequence.

The buffer store memory 204 is utilized to store the most frequently used or most recently used information that is being processed by the CPU 200. The buffer store memory is a relatively small, very high speed memory which contains 128 columns and 2 rows, referred to as the upper row and the lower row. It is logically divided into preset blocks which are uniquely addressable. These blocks are called pages and each page of memory contains 32 bytes of information. A particular page may be addressed by the most significant 16 bits of the main memory address, the least significant five bits being used to address a particular byte of information within the page. Pages may be transferred from main memory to buffer store memory with a column assignment maintained—i.e., a page from a column one in main memory is always transferred into column one in the buffer store memory. However, whether the information is placed on the upper or lower row of the column depends on availability. Therefore, for each column of main memory pages (for instance for a system having 256K to 2 megabytes in main memory, these would be 64 to 512 pages), there are two pages in buffer store. For example, column 37 in main store may contain any two pages of information from column 37 in main memory. The two pages of information contained in the buffer store column at any given time depend on which pages have been most recently accessed by the CPU—i.e., the two most recently accessed pages typically reside in the buffer store memory 204.

Whether a given page of information is contained in buffer store 204 can be determined only by examining the contents of the buffer store directory 205. The buffer store directory is logically divided in the same manner as buffer store, however, instead of pages of information, each column in the buffer store directory 205 contains the main memory row address of the corresponding information in the buffer store 204. For example, if column 0 of buffer store 204 contains page 20 in the lower row, the buffer store directory contains 10100 and 00000 in the lower and upper row respectively. Thus, by accessing the buffer store directory 205 with the column number and comparing the requested row number with the row number contained in the buffer directory location, the CPU can determine whether a given page is contained in buffer store.

The data management unit 206 provides the data interface between the CPU 200 and main memory 201 and/or buffer store memory 204. During a memory read operation, information may be retrieved from main memory or buffer store memory. It is the responsibility of the data management unit 206 to strobe the information into the CPU registers at the proper time. The data management unit also performs the masking during partial write operations.

The instruction fetch unit 208 which interfaces with the data management unit 206, the address control unit 207, the arithmetic and logic unit 212 and the control store unit 210 is responsible for keeping the CPU 200 supplied with instructions. The unit attempts to have the next instruction available in its registers before the completion of the present invention. To provide this capability, the instruction fetch unit 208 contains a 12-word instruction register (not shown) that normally contains more than one instruction. In addition, the instruction fetch unit, under control of the control store 210, requests instructions from main memory 201 before the instruction is actually needed, thus keeping its 12-word instruction register constantly updated. Instructions are thus prefetched by means of normally unused memory cycles. The instruction fetch unit also decodes each instruction and informs the other units of the instruction's length and format.

The address control unit 207 communicates with the instruction fetch unit 208, the buffer store directory 205, the main store sequencer 202, the arithmetic logic unit 212, the data management unit 206, and the control store unit 210 via the control store interface adapter 209. The address control unit 207 is responsible for all address development in the CPU. All operations of the address control unit, including transfers to, from and within the unit, are directed by control store micro-ops and logic in the unit. The normal cycling of the address control unit depends on the types of addresses in the instruction rather than on the type of the instruction. Depending on the address types, the address control unit may perform different operations fro each address in an instruction.

The address control unit 207 also contains an associative memory that typically stores the base address of the eight most recently used memory segments, along with their segment numbers. Each time a memory request is made, the segment number is checked against the associative memory contents to determine if the base address of the segment has already been developed and stored. If the base address is contained in the associative memory, this address is used in the absolute address development, and a considerable amount of time is saved. If the base address is not contained in the associative memory, it is developed by accessing the main memory tables. However, after the base address of the segment is developed, it is stored in the associative memory, along with the segment number, for future reference.

Interfacing with the address control unit 207, the instruction fetch unit 208 and the control store unit 310 is the arithmetic logic unit 212 which is the primary work area of the CPU 200. The arithmetic logic unit's primary function is to perform the arithmetic operations and data manipulations required of the CPU. The operation of the arithmetic logic unit is completely dependent on control store micro-ops from the control store unit 210.

Associated with the arithmetic logic unit 212 and the control store unit 210 is the local store unit 211 which may be comprised of a 256-location (32 bits per location) solid state memory and the selection and read/write logic for the memory. The local store memory 211 is used to store CPU control and maintainability information. In addition, the local store memory 211 contains working locations which are primarily used for temporary storage of operands and partial results during data manipulation.

The central processing unit 200 typically contains eight base registers located in arithmetic logic unit 212 which are used in the process of address computation to define a segment number, an offset, an a ring number. The offset is a pointer within the segment and the ring number is used in the address validity calculation to determine access rights for a particular reference to a segment.

The IOC 220 is the portion of the central processor subsystem that completes a data path from a number of peripheral subsystems to main memory. It provides the path through which peripheral commands are initiated, and it controls the resulting data transfers. The IOC can handle a maximum of 16 channel control units, and each channel control unit can accommodate one peripheral control unit. It is these peripheral control units which provide to the central processing subsystem the user's data base files.

Figure 3B:
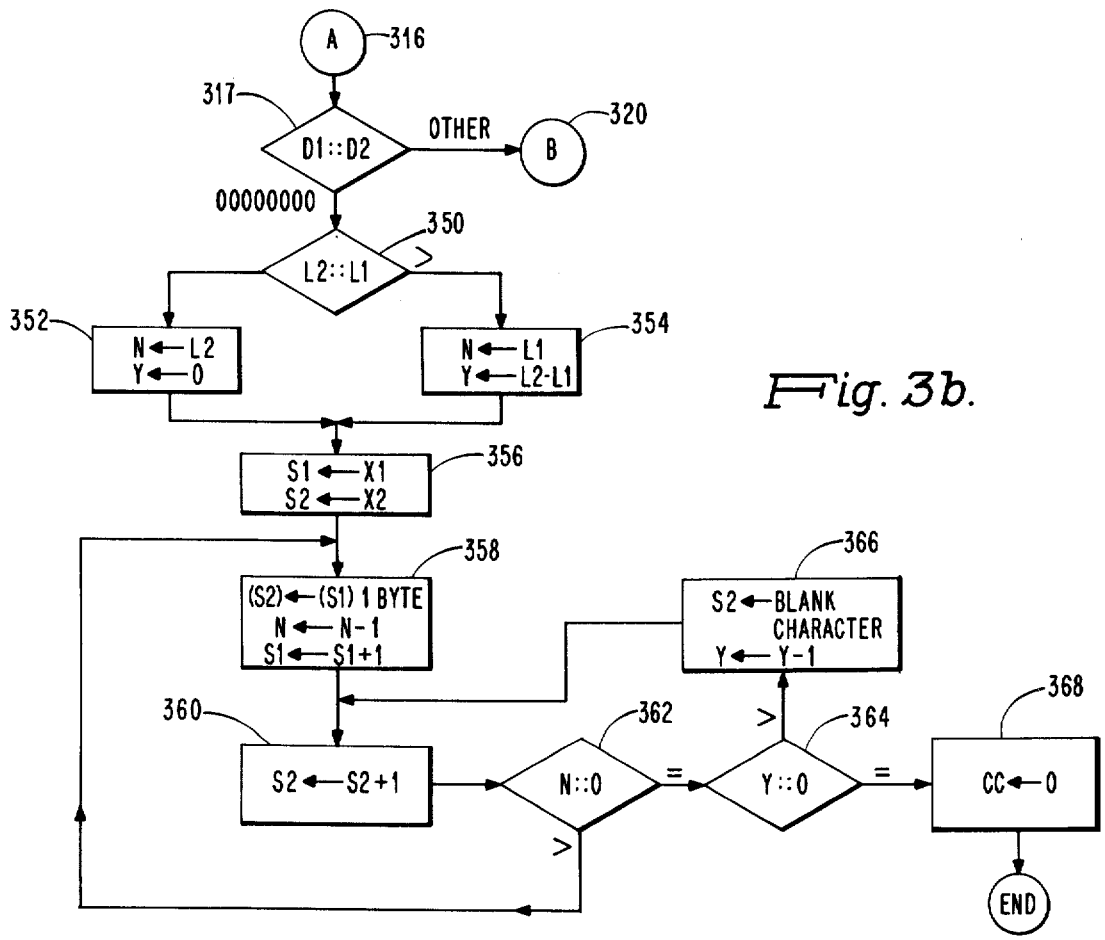
FIG. 3 (which includes FIGS. 3a–3c) is a diagram of the move instruction flow utilized in the present invention.
Figure 3A:
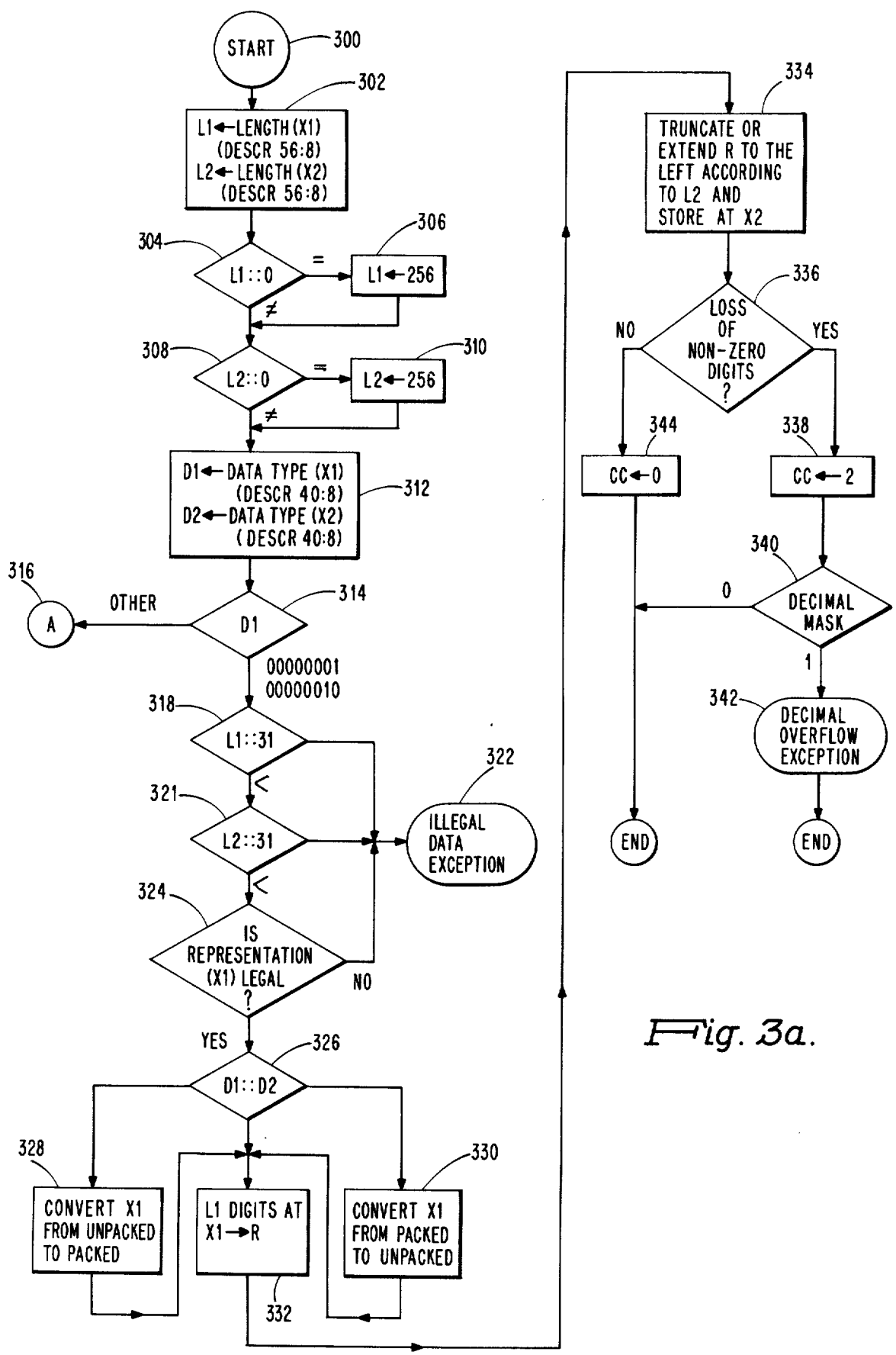

Referring now to FIG. 3 there is shown a flow diagram of the move instruction. FIG. 3 when read in conjunction with FIGS. 2 and 4 explain the overall operation of the system. FIG. 4 is a schematic diagram which shows the transfers and manipulations of the data by the move instruction at the system level. When read in conjunction with FIG. 3 showing the flow chart, the operation and procedure incorporated in the move instruction will be understood.

Since the present invention pertains to data processing systems, the description thereof can become very complex. To prevent undue burdening of the description with matter within the knowledge of those skilled in the art, a block diagram approach has been followed, with a functional description of each block and specific identification of circuitry it represents. The individual engineer is free to select elements and components such as flip-flop circuits, shift registers, etc. from his own background as from available standard references such as "Arithmetic Operations in Digital Computers", by R. K. Richards (Van Nostrand Pulbishing Company), "Computer Design Fundamentals" by Yaohan Chu (McGraw-Hill Book Company, Inc.) and "Pulse, Digital and Switching Waveforms", by Millman and Taub (McGraw-Hill Book Company, Inc.). Moreover, the details of the mechanism responsive to the microoperations for move instructions are not shown since they are well known to those of ordinary skill in the art.

It should be noted that FIG. 3 is a detailed flow diagram of step 432 of the Charles Bachman patent application previously cited on Page 2 as reference No. 5, and is one of the general purpose logical instructions which may be executed. As a result at this time, the instruction 100 shown in FIGS. 1a and 1b is stored in an instruction register 400 of the instruction fetch unit 208 shown in FIG. 2. The move operation code has been detected by control store interface adapter 209 which in turn enables control store unit 210 to provide for a series of tests upon the data and data field descriptors of both the source data and the destination. These tests are generated by microinstructions from the control store unit 210. The results of these tests are detected by control store interface adapter 209 which, depending on the tested results, may modify the next microinstruction such that a related microinstruction incorporated the detected condition is generated.

The interconnection of the control store unit 210 and the control store interface adapter 209 provides a micro-branch technique wherein the signals received by the control store interface adapter are translated into a direct address in the control store unit 210. The operation resulting establishes a direct path for subsequent data transfers taking into account the previously detected conditions. This sequence of events occurs for each diamond illustrated in FIG. 3 and is not hereafter described in any detail. (For a further explanation of this operation, reference to the U.S. Pat. No. 3,634,883 issued to Leonard Kreidermacher, Jan. 11, 1972, and U.S. Pat. No. 3,560,993 issued to Scott Schwartz on Feb. 2, 1971, both assigned to the same assignee as this invention, should be consulted.)

Prior to start step 300, the instruction 100 is processed so as to provide the data field descriptor and the data field. While there are many alternative methods for indirect address development (see, for example, U.s. Pat. No. 3,412,382, issued to Couleur et al on Nov. 19, 1968), a preferred method is as follows.

Each address syllable contains a predetermined bit field which identifies a base register located in arithmetic and logic unit 212. This base register contains a segment number and an offset. The segment number references a table which provides a descriptor locating the segment storing the data descriptor desired. To idenfify this data descriptor, the offset provided by the base register is added to the displacement field in the address syllable.

The data descriptor may contain up to three words as shown in FIG. 1c. This is initially determined by testing the tag field of word 102 which has now been fetched. If the tag field has a 01 encoding, it is known that there is at least one additional word, i.e., word 104. After fetching word 104, bits 36 to 38 are tested to determine if word 106 should also be fetched.

Word 102 is utilized to identify the location of the operand desired whereas words 104 and 106 identify the attributes of the operand located from word 102.

Word 102 is developed exactly as the address syllable. Thus, a base register is located, the base register having a segment number and an offset. After the segment number is referenced to a table to provide a segment descriptor locating the segment containing the operand, the offset in the base register is added to the displacement of word 102 thus identifying the exact location of the operand within the segment. All the computations described are performed in the authentic and logic unit 212 in a well known manner.

To summarize the development of the data field descriptors and the operand, the address syllable of the instruction in conjunction with a base register is used to locate the data field descriptors 102 to 106. Word 102 is then utilized in conjunction with another base register to locate the particular operand desired. Words 104 and 106 describe the attributes of the operand so located.

At start step 300 in FIG. 3, the attributes of the data field descriptors (i.e., word 104, and word 106, if necessary) have been tested with the following results. The data types are legal and have been determined to be compatible and the key fields are known to be identical. After testing, data field descriptors associated with the first and second address syllables are stored in working registers 406 in the local store unit 211.

In step 302, the AC register 408 contains word 104 associated with the source operand and the AD register 410 contains word 104 associated with the receiving operand. A selection mechanism 428 selects the length byte, i.e., bits 56–63 from both AC register and AD register and transfers them to the AA register 412 and the AB register 414 respectively. The selector mechanism 428 acts on any byte in the AC or AD registers. This can be accomplished by shifting the contents to predetermined locations or by merely selecting any bit positions contained within the register. The selector mechanism is not shown in detail since not only is it well known in the art, but also to describe it would unduly burden the description herein.

In step 304 the length attribute of the first address syllable is tested to determine whether or not it is zero. This is accomplished by subtracting via the AG register 420 a constant from the length attribute contained in register 412. The zero constant is loaded under control of control store unit 210. Since it is assumed that every field referenced has a length, if a zero is obtained from the subtraction, the actual length is 256 bytes long. Thus if a zero result is tested, the control store unit 210 loads all binary ONES into the AA register 412 in step 306.

For step 308 the same test is performed on the length attribute of the receiving operand. This length value indicates the space required to be reserved for the operand in the destination field. Step 308 corresponds to step 304 except that the constant loaded in AG register 420 is subtracted from the AB register 414 via calculator 422. At this time, the length for each of the operands involved in the move operation is known.

In step 312 a determination of the data type of the source data and the destination data is made. Depending upon the data type, branches to the different microinstructions in the control store unit 210 are made. In step 312, the ascertaining of the data types is made by transferring the bytes of each data type into the AA and AB registers, respectively, via the selector mechanism 428 operating on registers 408 and 410. The data type of the source data stored in AA register 412 is then ascertained via subtraction from a constant loaded into the AG register 420 by control store unit 210. If the testing of the result indicates that the data type is an alphanumeric string, then a branch to step 316 occurs. If the tests indicate that the data type is a packed or unpacked decimal, then a branch to step 318 occurs; and if the data type is neither an alphanumeric string nor a packed or unpacked decimal, then a branch to step 320 occurs. Each of these microbranches initiate a sequence of steps to control the transfer of data to the destination. Thus, in step 314, the testing of the data type is made. Since it has been previously ascertained that the data types are compatible, only the first data type need be ascertained to determine the branch to be taken.

For purposes of discussion, it is assumed that a packed or unpacked decimal number has been determined as the data type. Upon sensing this condition, a branch to step 318 is executed and the following steps are sequenced by microinstructions of the control store unit 210 on the packed or unpacked decimal.

In step 318, the length descriptor is restored to the AA register 412 associated with the source data, i.e., the first address syllable. Since a decimal string must be less than 32 digits, the length byte is tested to see whether this requirement is fulfilled. If upon subtraction from a constant 32 loaded in the AG register 420, a less than zero condition is realized, step 321 is executed. If the subtraction results in a positive number, then an illegal data exception in step 322 is executed. This step enables an exception routine which indicates that the data is incorrect. Since is is unusual that a number would be greater than 32 digits, step 321 follows. In step 321 the same test has occurred for the length data field descriptor associated with the destination data.

In step 324, a determination of whether the source data has a legal representation is made. Since the destination data represents the transfer of legal source data, no corresponding step for the destination data is required. For a decimal number, the determination of legality involves a testing of whether the source data representation contain binary numbers greater than 1001, i.e., the four bit binary number must not have a value greater than 1001 which corresponds to a decimal 9 and whether the sign binary number is less than 1010.

A packed decimal number is a series of contiguous bytes in main storage containing a sign and magnitude representation of a decimal interger. Each byte contains two four bit digit encodings except for the rightmost byte which contains a four bit digit encoding and a four bit sign encoding. In a packed decimal number, digit encodings of 1010 to 1111 and sign encodings of 0000 through 1001 are illegal.

An unpacked decimal number is a series of contiguous bytes in main storage containging a sign and magnitude representation of a decimal interger. Each byte contains a four bit digit encoding and a four bit zone except the rightmost byte which contains a digit and sign encoding. The zones encodings of each byte of the unpacked decimal are not tested by the control store unit 210. The representation of an unpacked decimal number is illegal if, as with a packed decimal, either a digit encoding or a sign encoding is illegal.

After step 324, control store unit 210 executes microinstructions to compare the source operand data type to the destination operand data type. As a result in step 326, a multibranch situation from the comparison results. This step is accomplished by subtracting the value of the data type associated with the source operand from the data type associated with the destination operand. The result of the subtraction is a number which enables the multibranch operation to occur. Thus, if the source data is unpacked decimal and the destination data is packed decimal, a branch to step 328 occurs. If the source data is packed decimal and the destination data is unpacked decimal, a branch to step 330 occurs. If the source data and the destination data are the same, step 332 is executed.

For step 324 and for steps 328, 330 and 332, the accessing of main memory to obtain the source operand is performed. This is accomplished as follows. The main memory location as determined from the first address syllable is developed into a data descriptor which identifies the proper memory location. That data is then fetched from memory into the DN register 402 of the data management unit 206. The data is then transferred into the working registers 406 of local control unit 211. When the successive bytes have been accessed from memory, and the length field reduced to zero, the transfer of information from main memory is halted. With the information now located in the working store registers 406, transfer under micro-operation control is then made to the AC or AD registers as is necessary. For the transfer of the data to the destination register, the physical configuration of the data processing system limits the number of bytes transferred at a given moment. For the system described in FIG. 2, this would be 2 bytes at a time.

In step 328, a translation from unpacked to packed decimal is executed. This is accomplished by taking the digit representation and eliminating the zone of the unpacked decimal byte. In the last byte of the unpacked decimal, the four bit binary digit and the four bit binary sign are interchanged thus allowing a correspondence of form to the packed decimal representation. With the source data in packed format and the destination data requiring the packed format, the execution of step 332 is a mere transferral of the information into a destination location determined by the data processor.

For step 330, conversion from a packed decimal format to an unpacked decimal format is accomplished. This results by adding a four bit zone to each decimal representation in the packed format and by exchanging in the last byte the location of the digit and sign encodings. Thus, the source data is in an unpacked format. In step 332 a transferral of the data to the destination location is accomplished with the information remaining unchanged.

The reformatting of the data from packed decimal to unpacked decimal or vice versa is accomplished by utilizing the AG register to provide the zone constant. If the packed decimal to unpacked decimal reformatting is to be executed, the calculator 422 is set to add by the control store unit 210. The digit encoding is provided in the lower four bits of the byte and the zone encoding is provided in the upper four bits of the byte. The addition operation then provides the unpacked decimal format and stores the result in local store unit 211. If the opposite situation is presented, i.e., the reformatting is from unpacked decimal to packed decimal, then a transfer of the lower four bits to working registers 406 is made with the higher four zone bits discarded. Obviously, many other variations for providing the reformatting of packed and unpacked decimals may be implemented by those of ordinary skill in the art.

Since the source data and the destination data may have different lengths, step 334 indicates which length is greater. If the source data has been transferred and there is additional space according to the destination length, then extension of the source data by the addition of zeros is made. These zeros are added to the high ordered part of the number and hence no modification of the number is made. If there remains source data to transfer, but there is no space available according to the destination length indication, then the remaining bytes are truncated, i.e., the data is not transferred. Steps 336 to 344 enable the setting of condition codes to indicate whether the digits of truncated source data is significant, i.e. whether they were non-zero. If there were non-zero digits lost which is determined by a test of the remaining digits in the source data, control store unit 210 in step 338 sets the condition code in the status register 418 to a binary TWO.

Subsequently in step 340, a test is made as to whether the truncated non-zero digits are significant to the integrity of the data. This is accomplished by means (not shown). If these digits were significant, then a decimal overflow exception would be executed such that the truncated portion of the source data would be handled.

If there were no loss of non-zero digits or if there was no truncation involved, step 344 would be executed. The control store unit 210 sets the status register 418 to a binary ZERO before ending the present instruction and initiating the next instruction.

In step 314, it was determined that the source data was a decimal. However, if the source data was an alphanumeric string, a branch to step 316 is executed.

In step 317 as shown in FIG. 3b, comparison of the data type of both the source and destination data is made. This is accomplished by subtracting the data types from each other. If the data types are unequal, a branch to step 320 is made. If the data types are equal, i.e., if the result is zero, control store unit 210 executes microinstructions shown as steps 350 to 368.

In step 350 it is known that both the source data and the destination data are alphanumeric strings. In step 350 the length byte of the data field descriptor associated with the second address syllable, i.e., L2, is subtracted from the length byte of the data field descriptor associated with the first address syllable, i.e., L1. The result determines whether a branch to step 352 or to step 354 is executed. Regardless of the result, two temporary registers in working registers 406 are utilized. A first temporary register, hereinafter referred to as N, stores the minimum length description. A second temporary storage register hereinafter referred to as Y, stores the number of zeros which are added to the destination data.

If the length of the destination data is less than or equal to the length of the source data, i.e., if a zero or negative number is sensed by control interface adapter 209, a branch to step 352 is executed. With this situation, control store unit 210 sets the N register to the length of the L2 field. Since the receiving field is not greater than the source field, no blank characters, i.e., binary zeros are added. As a result, the Y register is set to a binary zero. If a positive number is sensed by control interface adapter 209 in step 350, then a branch to step 354 is executed. In step 354 the contents of the length L1 are transferred to register N and the remainder value from calculator 422 is transferred into the Y register. Thus the Y register indicates when it is necessary to stop the blank characters from being added to the destination data.

In step 356, the temporary location of the source and destination data is specified. This is shown by the address X1 which points to the source data in main memory and the address X2 which points to the place in main memory where the data will be written, being changed to S1 and S2, respectively. S1 indicates the address of the source data in the working registers 406 and S2 indicates the address to store the transferred data in working registers 406.

In step 358, control store unit 210 enables micro-operations which transfer the contents of the S1 registers to the S2 registers, one byte at a time. The number of bytes as indicated by the value stored in the N register is then decremented by one thus indicating how many additional bytes are to be transferred. This is accomplished by subtracting one via a constant in the AG register from the N register value transferred and stored in AA register 412. Thus the N-1 value is now stored in the N register. The address of the byte to be transferred, i.e., S1, is incremented by one since the next byte of the source data must be address. The micro-operations which perform this addition step have been previously described.

In step 360, the address of the next byte to be received, S2, is incremented by one since the data is stored consecutively in the working registers 406. This is shown as the S2 address becoming the S2+1 address. Thus, the registers are now set up so that the next byte of the data may be transferred.

After the contents of one byte have been transferred and the various registers set up to indicate the next data byte to be transferred, step 362 tests whether or not the minimum length field, i.e., the minimum of either of the L1 source field or L2 destination field, has been transferred. If this has not occurred, a looping back to the actual transferral step, i.e., step 358 is executed. If the minimum length has been transferred, then the value of the Y register is tested to determine whether any blank characters should be added to the destination registers. This is shown in step 364.

If the value in the Y register is unequal to a zero, and the value of the N register is presently zero, then blank characters are added to the destination data, i.e., S2, and the value of the contents contained in the Y register are decremented by one as shown in step 366. This can be accomplished by loading a one in the AG register 420 and subtracting the contents of the Y register which is contained in the AB register 414. The results from calculator 422 of byte adder 416 are then stored back into AB register 414. Upon adding a blank byte to the destination data, the address S2 is incremented again as shown in step 360. This process continues until the value in the Y register is zero. At this time, step 368 is executed which sets a condition code in the status register 418 to a zero and initiates the next instruction.

Figure 3C:
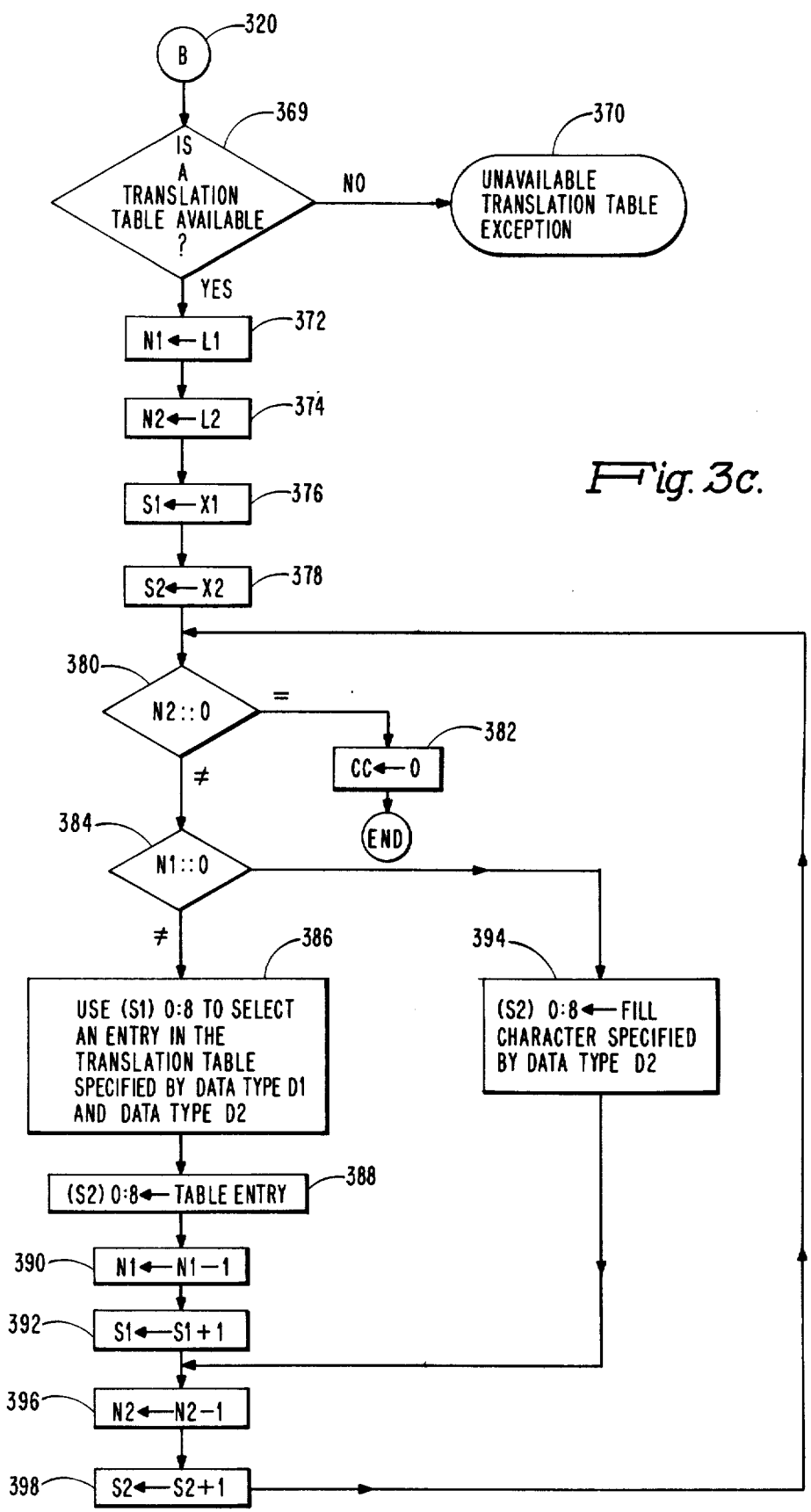
Figure 4:
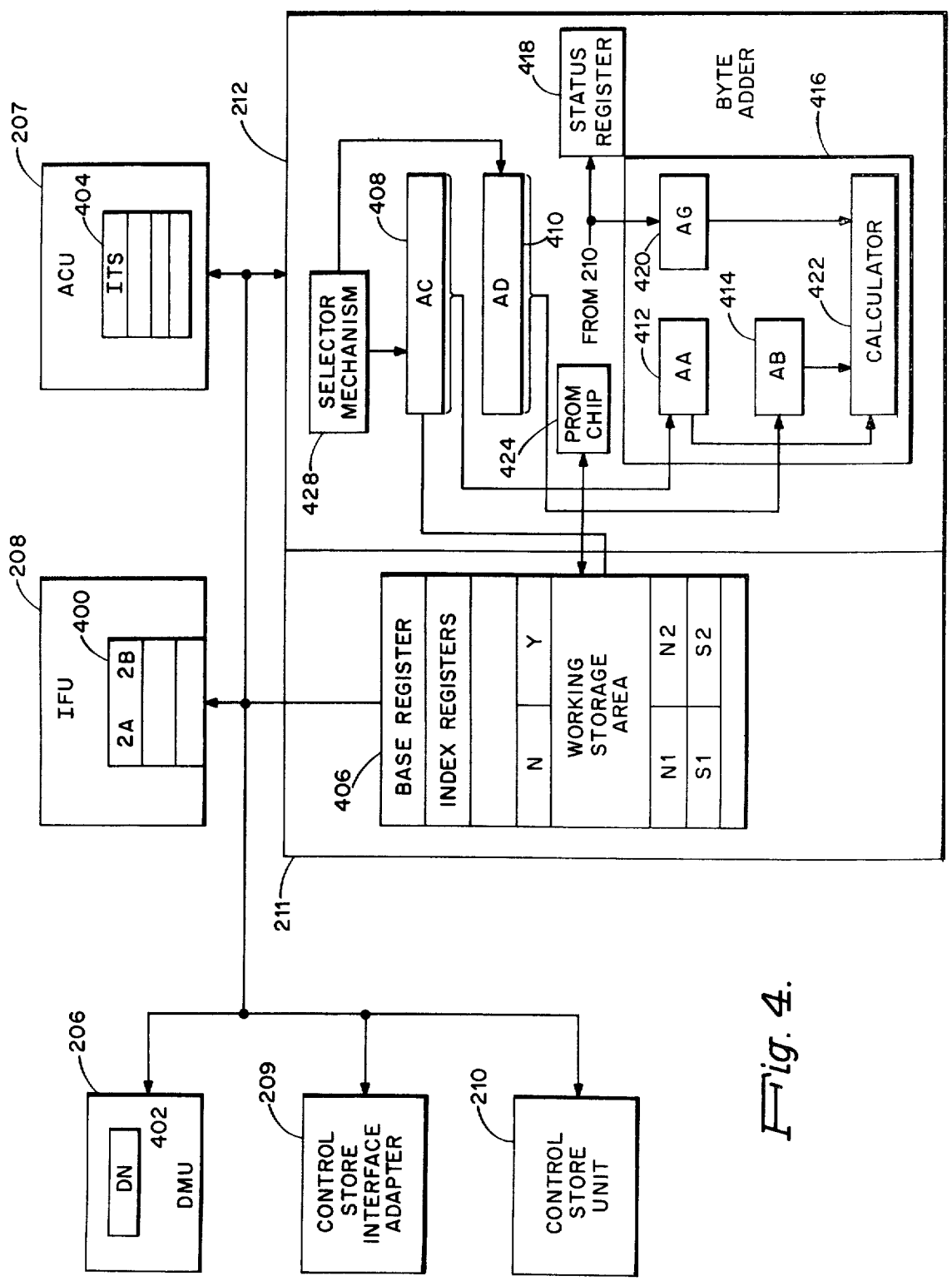
FIG. 4 is a schematic diagram of circuitry utilized in the data processing system of FIG. 2 and designed to carry out the move instruction shown in FIG. 3 in accordance with the present invention.

If at step 314 the data type was neither an alphanumeric string nor a packed or unpacked decimal, a branch to step 320 FIG. 3c is executed. In step 320 it is recognized that the destination data requires a translation of the source data. For this operation, a number of translation devices have been provided on programmable read only memory chips. These translation devices 424 receive an eight bit input of the source data as stored in working area 406 and provide an eight bit output to working area 406 and eventually to the destination location. The output of the hardwired programmable read only memory chips provide the same information expressed, however, in the destination code.

If in the test provided by step 369 there is no translation device available, then step 370 is executed. Step 370 is a branch by the control store unit 210 to an unavailable translation table exception. This branch notifies a mechanism that no table has been provided and, as such, other means must be used. This other means is not disclosed herein.

Assuming that one of the translation tables 424 is provided, steps 372 through 378 are executed. In each of these steps, a temporary storage register is set up as was done in steps 350 to 360. Thus the lengths and addresses of the data are stored in temporary storage registers N1, N2, S1, S2 respectively. In step 380 a test is made of the destination length. If this is zero, i.e., if there is no further storage spaces for the source data, then a condition code in status register 418 is set to zero and the translation process is completed. Usually, however, the destination length is greater than zero, so step 384 is executed.

If the source length as tested in step 384 is equal to zero and the destination length is not equal to zero as tested in step 380, the destination data must have its remaining length filled by blank bytes. This is shown in step 394. Once a blank byte field has been added, the destination length and address are decremented and incremented, respectively, and the above steps are repeated.

If the source length is not equal to zero, and the destination length is not equal to zero, then step 386 is executed. In step 386, the prom chip 424 enables the contents of the source data to be translated. The output of the prom chip is then provided in step 388 to temporary storage register, S2, in the code specified by the destination data. These codes are well known to those of skill in the art and need not be shown herein. Steps 390, 392, 396, and 398, account for the total number and addresses of bytes to be transferred as was previously explained.

When the destination length is equal to zero, the entire operation is terminated and the next instruction is executed. This occurs whether or not the source data has been fully transferred. If this condition exists, the source data to be transferred is lost.

Although it has been shown, described and pointed out the fundamental novel features of the invention applied to the preferred embodiment, it is understood that various omissions, substitutions and changes in the form and details of the device illustrated in this operation may be made by those skilled in the art without departing from the spirit of the invention. For example, the move instruction described in the prior art may be combinable with the move instruction disclosed herein such that either the source or destination field is described in the instruction itself and the other field is described at execution time by the data field descriptor. This would provide a hybrid situation wherein one portion of the instruction is logical using a data field descriptor and the other portion is structured at compilation time.

A variation of the basic move instruction may be provided by a change in the operation code. One example of this specialized move instruction would involve changing the data field descriptor of the destination field. Thus, both the data field and the data field descriptor would be moved with the data field being essentially preserved but with the data field descriptor of the destination being reformatted since it is now the same as the source field's data field descriptor. This specialized move instruction would be useful when a new format for the data fields is desired. It provides the flexibility needed to easily alter the configurations of the data fields on a day-to-day basis. Moreover, this specialized move instruction would find applicability wherein movements of the data fields is within the data processor itself, and it is desired to keep the original form of the data.

It is the intention, therefore, to be limited only as indicated by the scope of the following claims.

What is claimed is:

1. An apparatus for moving data fields having a plurality of data structures from a first location to a destination said apparatus comprising:
    means for storing a move instruction;
    means responsive to one portion of said move instruction for addressing said first location which contains a first data field descriptor, said first data field descriptor describing the location and attributes of a data field;
    second means responsive to a second portion of said move instruction for addressing said destination which contains a second data field descriptor, said second data field descriptor describing the location and attributes of a data field when stored in said destination; and
    means responsive to a third portion of said move instruction for transferring one data field from said first location to said destination, said transferring means including means for reformatting at execution time said one data field to conform with the attributes described by said second data field descriptor;
    said attributes of said first and said second data field descriptors including data type, key field and length descriptions.

2. An apparatus as defined in claim 1 wherein said data type description of said first data field descriptor and said data type description of said second data field descriptor are unequal.

3. An apparatus as defined in claim 1 wherein said length description of said first data field descriptor is unequal to said length description of said second data field descriptor.

4. An apparatus as defined in claim 1 wherein said key field descriptions identify the dimensionality of said one data field.

5. An apparatus as defined in claim 1 and further including:
    first and second registers, and
    wherein when said data type of said data fields are both alphanumeric strings, said transferring means in response to said data type being an alphanumeric string transfers into said first register the lesser length description of said first and said second data field descriptors and transfers to said second register the difference between said length descriptions of said second data field descriptor and said first data field description.

6. The apparatus as defined in claim 5 wherein said transferring means in response to said first register transfers said one data field one byte at a time and wherein said transferring means further include means for adding to said alphanumeric string a number of blank characters corresponding to the value indicated by said second register.

* * * * *